United States Patent [19]

Suslin et al.

[11] 4,139,446

[45] Feb. 13, 1979

[54] DEVICE FOR ELECTROLYTIC TREATMENT OF WORKPIECES

[75] Inventors: Vladimir I. Suslin; Alexandr I. Dubovik; Boris A. Makeev; Pavel S. Razdymakha; Zinovy A. Lekarev; Vitaly A. Pilipenko; Alexandr I. Etnaer, all of Kharkov, U.S.S.R.

[73] Assignee: Nauchno-Issledovatelsky Institut Avtomatizatsii Upravlenia I Proizvodstva Niiap, U.S.S.R.

[21] Appl. No.: 815,448

[22] Filed: Jul. 13, 1977

[51] Int. Cl.² .............................. B23P 1/04; B23P 1/16
[52] U.S. Cl. ................................ 204/224 R; 204/277; 204/278; 204/224 M
[58] Field of Search .............. 204/224 R, 224 M, 275, 204/277, 278, 129.5, 129.6, 129.7

[56] References Cited

U.S. PATENT DOCUMENTS

| 3,554,891 | 1/1971 | Duffy et al. | 204/275 X |
|---|---|---|---|
| 3,761,367 | 9/1973 | Zubak et al. | 204/129.5 |
| 3,773,636 | 11/1973 | Augustin | 204/277 X |
| 3,841,990 | 10/1974 | Sasaki et al. | 204/277 X |

FOREIGN PATENT DOCUMENTS 313640  5/1972  U.S.S.R. .............................. 204/224 M

*Primary Examiner*—John H. Mack
*Assistant Examiner*—D. R. Valentine

*Attorney, Agent, or Firm*—Robert E. Burns; Emmanuel J. Lobato; Bruce L. Adams

[57] ABSTRACT

A method of electrolytic treatment of workpieces by the alternate and separate feeding of at least two liquid media into the working space between the tool and the workpiece, at least one of said liquid media being electrolyte, and by the separate discharge of said media after the treatment of the workpiece, the working space being supplied with a gas under pressure in the period between the feeds of said liquid media.

A device for the realization of said method comprises a working chamber which accommodates a tool and a workpiece, a common pipe for feeding alternately at least two liquid media into the working space between said tool and the workpiece, said common pipe combining the individual pipes for each of said liquid media and gas after their union coupling, said liquid media being separately discharged after the treatment of the workpiece through an intermediate container into the corresponding containers for the different liquid media with the aid of a means for alternating the supply of at least two liquid media to the workpiece and their discharge after treatment, said means comprising a distribution valve installed directly in the union coupling of the individual pipes, a control element linked kinematically with the distribution valve, and a mechanism for separating the discharge of the different liquid media, kinematically linked with the distribution valve and the control element.

3 Claims, 14 Drawing Figures

DEVICE FOR ELECTROLYTIC TREATMENT OF WORKPIECES

FIELD OF APPLICATION

The present invention relates to electrolytic treatment of workpieces and more particularly it relates to a method of electrolytic treatment of workpieces and to a device for its realization employed during alternate treatment of metals in different liquid media on electrolytic, electroerosion and contour-broaching machines.

BACKGROUND OF THE INVENTION

Known in the prior art is a method of electrolytic treatment of workpieces in two liquid media, (electrolytes) delivered alternately into the working space between the tool and the workpiece.

The prior art device for the realization of this method comprises a working chamber accommodating the workpice and the tool in the form of a nozzle with two delivery pipes for different electrolytes supplied alternately into the working space between the tool and the workpiece.

In the given prior art device when the feed of one electrolyte is changed over to another electrolyte, the remaining quantity of the first electrolyte is not completely removed so that the different liquid media are gradually mixing.

After electrolytic treatment the finished article is flushed by another device.

Also known in the prior art is a method of electrolytic treatment of workpieces in two liquid media, i.e. electrolyte and washing liquid, by alternately and separately feeding them into the working space between the workpiece and the tool and discharging them separately after treatment of the workpiece.

Known in the prior art is a device for electrolytic treatment of workpieces in two liquid media, i.e. electrolyte and washing liquid, which realizes said method and comprises a working chamber accommodating a tool and a workpiece, the working space between them being supplied alternately with two liquid media, i.e. electrolyte and washing liquid, through a common pipe combining individual pipes for the electrolyte and washing liquid after their union coupling, said liquids being separately discharged from the chamber after the treatment operation with the aid of a means for alternating the supply of said liquid media to the workpiece and their discharge after the treatment operation through an intermediate container so that the electrolyte returns into the electrolyte container whilst the washing liquid drains outside.

In the cited device the means for alternating the supply of liquid media to the workpiece and their discharge after machining comprises separate valves on each of said pipes which are provided with separate pumps. In this device, after the power is supplied to the tool and the workpiece, the electrolyte is fed by the pump from the electrolyte container through a separate pipe and a separate valve then through the common pipe into the working space between the workpiece and the tool, whereupon it is returned into an intermediate container installed separately from the chamber. From said intermediate container the electrolyte is pumped through a separate valve and a separate pipe again into the electrolyte container.

On completion of treatment of the workpiece the valve installed on the pipes for electrolyte and for pumping the electrolyte from the intermediate container are closed and the working space begins to be supplied with a washing liquid which is pumped through the pipe and valve of its own and then through the common pipe, washing all the lines of the device on its way.

After washing the workpiece, the washing liquid is drained from the working chamber through the same pipe as the electrolyte, into the same intermediate container and thence it is forced by a separate pump through a separate valve and pipe to drainage. Then this cycle is repeated over again during the next treatment operation. During each cycle the liquid media become gradually mixed with each other at the moment of changing the feed from one liquid to the other, and certain quantities of electrolyte are lost. Besides, all the valves are controlled independently which complicates the design of the device and impairs its reliability in operation.

All these factors taken together reduce the stability of treatment of workpieces and, consequently, affect adversely the standard of treatment.

It should also be noted that the given prior art device cannot be used altogether whenever there is a need for treatment of workpieces with more than two liquid media.

BRIEF DESCRIPTION OF THE INVENTION

The main object of the invention resides in providing a method of electrolytic treatment of workpieces and a device for the realization thereof which would ensure a maximum possible removal of the remainder of one liquid medium from the lines of the device prior to treatment of the workpiece with another liquid medium and thus eliminate their mixing and retain the constancy of composition of each liquid medium for its reuse in the subsequent cycles.

Another object of the invention resides in providing a method of electrolytic treatment of workpieces and a device for realization thereof which would enable to treat the workpiece with more than two different liquid media.

A further object of the invention resides in providing a novel method realized by a device for electrolytic treatment of workpieces which is comparatively simple in design and highly dependable in operation.

The essence of the invention consists in providing a method of electrolytic treatment of workpieces by alternate and separate feeding of at least two liquid media into the working space between the tool and the workpiece, at least one of said media being electrolyte, and by separate discharging of said liquid after the treatment operation wherein, according to the invention, within the time between successive feeding of the liquid media the working space is supplied with a gas under pressure.

The essence of the invention also consists in that the device for the realization of the method of electrolytic treatment of workpieces comprises a working chamber accommodating a tool and a workpiece, the working space between them being supplied alternately with at least two said liquid media through a common pipe combining the individual pipes for each of said liquid media after their union coupling, said media being discharged after the treatment operation through an intermediate container into the corresponding containers for the different liquid media with the aid of a means for alternating the supply of at least two liquid media to the workpiece and their discharge after treatment wherein, according to the invention, said device has an individual pipe for feeding a gas under pressure, said individual pipe being connected in the union coupling to the common pipe, the means for alternating the feeding and discharge of the different liquid media comprises a distribution valve installed directly in the union coupling of the individual pipes, and a control element linked kinematically with the distribution valve for alternate opening by said valve of the pipes for the liquid media and gas to pass in a predetermined order, and a mechanism for separating the discharge of the different liquid media operatively connected with the distribution valve and the control element. The mechanism for separating the discharge of the different liquid media may comprise cam and two gates installed in the ports of one of the walls of the intermediate container and alternately opened and closed by the cam which is operatively connected by an articulated joint to a rod which is connected to the distribution valve and the control element, the internal member of the joint rigidly connected with the rod being provided with a projection whilst the external member of the joint, rigidly connected with the cam, has an internal space which is segment-shaped in cross section.

The mechanism for separating the discharge of the different liquid media may comprise a drain cock in the form of a disc with a through hole, rigidly fastened with a bar set square to its surface, and installed rotatably in a hollow on the bottom of the intermediate container said bottom being provided with holes for the discharge of the liquid media, the number of said holes corresponding to the number of the separated liquid media and said holes being arranged around the circumference on a radius which is equal to the distance from the centre of the disc to the location of the hole therein, and the bar is operatively linked by bevel gears with a rod connected with the distribution valve and the control element, the holes in the bottom of the intermediate container being spaced at a distance from one another which is larger than the maximum size of the hole in the disc and the ratio of the size of the hole in the disc and that of the hole in the bottom of the intermediate container being chosen so as to ensure alignment of these holes both during the discharge of one liquid medium and during the subsequent feeding of a gas under pressure.

BRIEF DESCRIPTION OF THE DRAWINGS

Now the invention will be described in detail by way of its embodiments with reference to the accompanying drawings, in which.

DETAILED DESCRIPTION OF THE INVENTION

The method of electrolytic treatment of workpieces according to the invention consists in the following.

The working space between the workpiece and the tool is supplied first with one liquid medium, then with a gas under pressure, then with the second liquid medium, then again with a gas under pressure, and so on.

In the course of feeding a liquid medium and the subsequent supply of a gas under pressure there is a provision for the separate discharge of the first liquid medium after the treatment of the workpiece.

If a workpiece is treated with three liquid media, the following patterns of electrolytic machining are possible:

(1) first electrolyte — gas — second electrolyte — gas — third electrolyte — gas;

(2) first electrolyte — gas — second electrolyte — gas — washing medium — gas;

(3) first electrolyte gas — washing medium — gas — passivating solution — gas.

The device for the realization of the method of electrolytic treatment of workpieces comprises a working chamber 1 (FIG. 1) accommodating a workpiece 2 and a tool (electrode) 3, and the working space 4 between them is supplied alternately with two liquid media and a gas through a common pipe 5.

Figure 1:
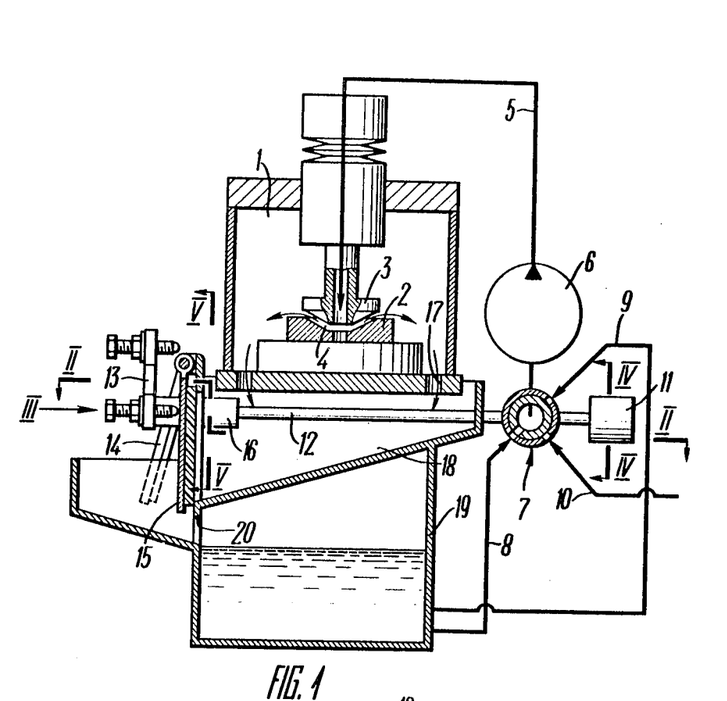
FIG. 1 is a longitudinal section of the device for electrolytic treatment of workpieces with two liquid media showing the gates set to a position for treatment with one liquid medium, according to the invention.

The common pipe 5 is provided with a pump 6 while at the beginning of said pipe 5 there is a distribution valve 7 installed directly in the union coupling which combines an individual pipe 8 for feeding one liquid medium, an individual pipe 9 for feeding the other liquid medium and an individual pipe 10 for feeding a gas under pressure.

The control element 11 is operatively connected by a rod 12 with the distribution valve 7 and with a mechanism for separating the discharge of the different liquid media.

Said mechanism for separating the discharge of different liquid media comprises a cam 13 and two spring-loaded gates 14 and 15.

In FIG. 1 the gate 14 is shown open and the gate 15, closed.

The rod 12 is kinematically linked with the cam 13 by an articulated joint 16.

The bottom of the working chamber 1 has holes 17 for the discharge of the liquid media after the treatment of the workpiece 2 into an intermediate container 18 provided with parts in one of its side walls.

Installed under the intermediate container 18 is a tank 19 connected with the container by holes 20 and divided by a partition 21 (FIG. 2) into two containers 22 and 23. The same drawing also shows the ports 24 and 25 in the side wall 26 of the intermediate container 18 (FIG. 1).

The container 22 (FIG. 2) for one liquid medium is connected with the pipe 8 whilst the container 23 for the other liquid medium is connected with the corresponding pipe 9.

The means for changing over the supply of two liquid media to the workpiece and their discharge after treatment via the intermediate container 18 into the corresponding containers 22 and 23 incorporates said distribution valve 7 (FIG. 1), a control element 11 and a mechanism for separating the discharge of the different liquid media, comprising a cam 13 and two gates 14 and 15.

Figure 3:
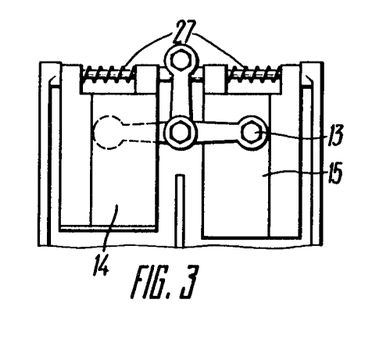
FIG. 3 is a view along arrow III in FIG. 1 of the gate and cam in the device for electrolytic treatment workpieces according to the invention.

FIG. 3 shows the cam 13 in the position for holding the gate 15 closed. The gates 14 and 15 are loaded with springs 27.

The control element 11 (FIG. 1) is made in the form of a handle 28 (FIG. 4) and three locking holes 30 located on a panel 29 along the rotation of said handle 28.

Figure 4:
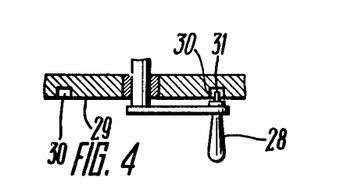
FIG. 4 is a section taken along line IV—IV in FIG. 1, enlarged of the control element of the device for electrolytic treatment of workpieces according to the invention.

The handle 28 is provided with a catch 31 intended to enter the locking holes 30.

Figure 5:
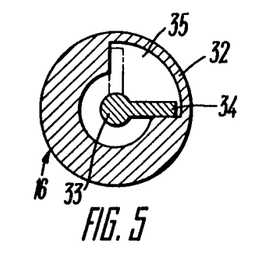
FIG. 5 is a section taken along line V—V in FIG. 1 of the articulated joint used in the device for electrolytic treatment of workpieces according to the invention.

The articulated joint 16 consists of an external member 32 (FIG. 5) and an internal member 33. The member 33 rigidly connected with the rod 12 (FIG. 1) has a projection 34 (FIG. 5). The member 32 rigidly connected with the cam 13 (FIG. 1) has a space 35 (FIG. 5) whose cross section is shaped like a 90° segment.

Figure 6:
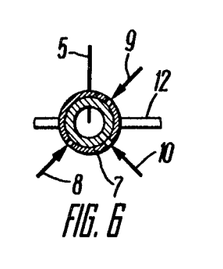
FIG. 6 is a cross section of the distribution valve of the device according to the invention, in the position for feeding a gas under pressure.
Figure 7:
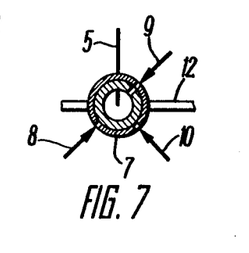
FIG. 7 is a cross section of the distribution valve in the device according to the invention, shown in the position for treatment of the workpiece with the second liquid medium.
Figure 8:
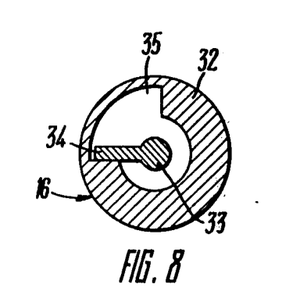
FIG. 8 is a section taken along line V—V in FIG. 1 of the articulated joint of the device in the position for treatment with the second liquid medium, according to the invention.
Figure 9:
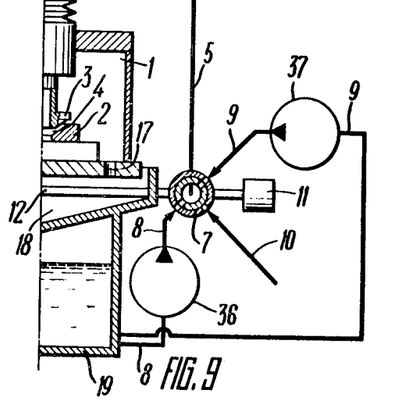
FIG. 9 is a longitudinal section of a part of the device for electrolytic treatment of workpieces according to the invention, with two individual pumps in the pipes for the liquid media.

FIG. 6 shows the valve 7 in the position for feeding a gas under pressure and FIG. 9 illustrates in dotted lines the position of the member 33 in the joint 16 corresponding to this position of the valve 7;

FIG. 7 shows the position of the valve 7 for feeding the other liquid medium and FIG. 8 illustrates the positions of the members 32 and 33 of the joint 16 when the projection 34 is turned through 180° from the position shown in FIG. 5.

The resultant position of the cam 13 (FIG. 3) in which the gate 14 is kept closed and the gate 15, open, is shown in dotted lines in FIG. 3.

FIG. 9 shows two individual pumps 36 and 37 installed, respectively, in the lines of the pipes 8 and 9. In the given embodiment of the invention there is no need in installing the pump in the common pipe 5.

The method of electrolytic treatment of workpieces according to the invention can also be realized with the employment of more than two liquid media.

In this case, the mechanism for separating the discharge of different liquid media has a modified design.

Figure 10:
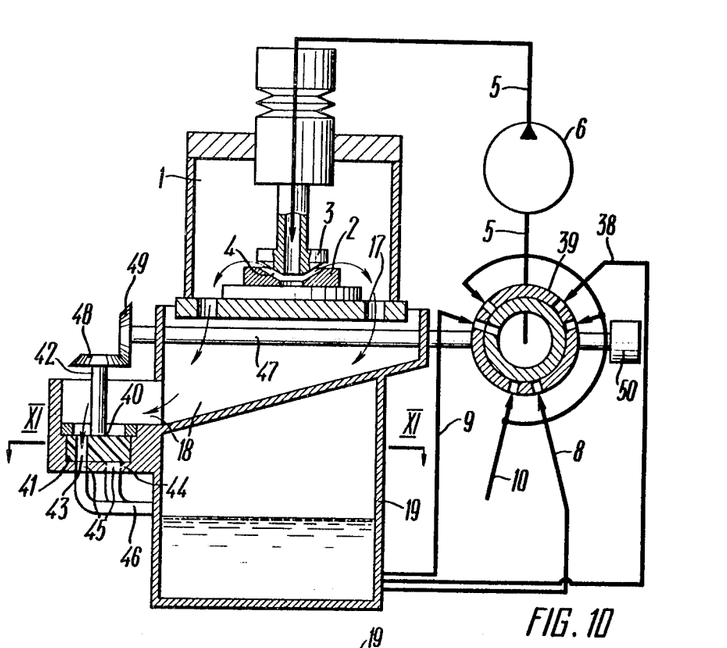
FIG. 10 is a longitudinal section of the device according to the invention for treatment of parts with three liquid media.

FIG. 10 shows a device for electrolytic treatment of parts with three liquid media.

This device comprises an additional individual pipe 38 for feeding the third liquid medium and the valve 39 has an additional inlet for said liquid medium and two additional gas inlets from the pipe 10, the gas inlets being located between the inlets for the liquid media.

The mechanism for separating the discharge of the three different liquid media comprises a drain cock 40 in the form of a disc 41 rigidly secured to a bar 42 which is set square to the surface of said disc 41.

The disc 41 has one through hole 43 whose axis is parallel to the axis of the bar 42.

The drain cock 40 is installed on the bottom 44 of the intermediate container 18 with provision for rotating around the axis of the bar 42.

The bottom 44 is provided directly under the disc 41 with three through holes 45 for the discharge of different liquid media, said holes being arranged around the circumference on a radius which is equal to the distance from the centre of the disc 41 to the hole 43 therein.

The minimum distance between each pair of holes 45 is larger than the maximum size of the hole 43 in the disc 41 and the ratio of the sizes of the holes 43 and 45 is 2:1.

The holes 45 are connected, each, by an individual pipe 46 to the corresponding containers for the discharge of different liquid media.

The bar 42 is kinematically linked with a rod 47 by bevel gears 48 and 49, the first one of which is connected with the bar 42 and the other one, with the rod 47.

The rod 47 is linked kinematically with the distribution valve 39 and with the control element 50.

Figure 11:
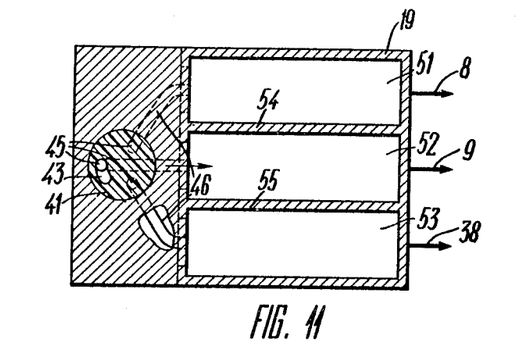
FIG. 11 is a section taken along line XI—XI in FIG. 10 of the same device according to the invention.

FIG. 11 shows that the pipes 46 are connected with the corresponding containers 51, 52 and 53 in the tank 19 which is divided by the partitions 54 and 55 and each of the containers 51, 52 and 53 is connected, respectively, to the individual pipe 8, 9 and 38.

The control element 50 (FIG. 10) is also made in the form of a handle 28 (FIG. 4) and locking holes 30 located on the panel 29 along the rotation of the handle 28; in this particular case there are six holes.

Figure 12:
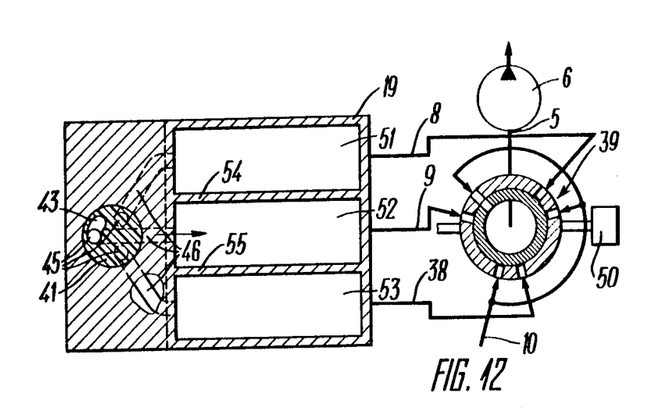
FIG. 12 is a section taken along line XI—XI in FIG. 10 of the device for electrolytic treatment of parts with three liquid media according to the invention with the distributing valve in the position for feeding a gas under pressure.
Figure 13:
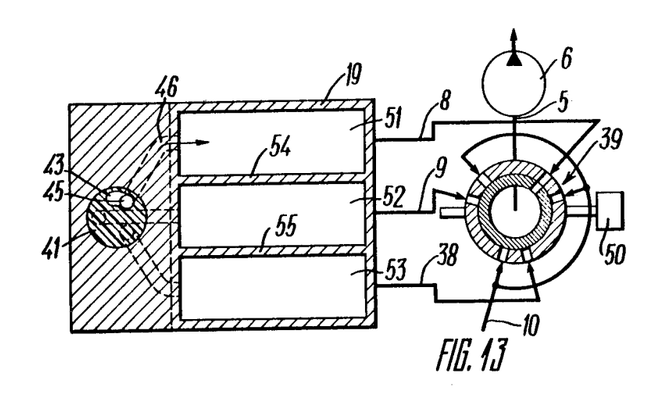
FIG. 13 shows the same device according to the invention with the distribution valve set for feeding the second liquid medium.

FIG. 12 shows the relative arrangement of the holes 43 and 45 and the position of the distribution valve 39 for feeding a gas under pressure whilst FIG. 13 shows the same during the feeding of the other liquid medium.

Figure 14:
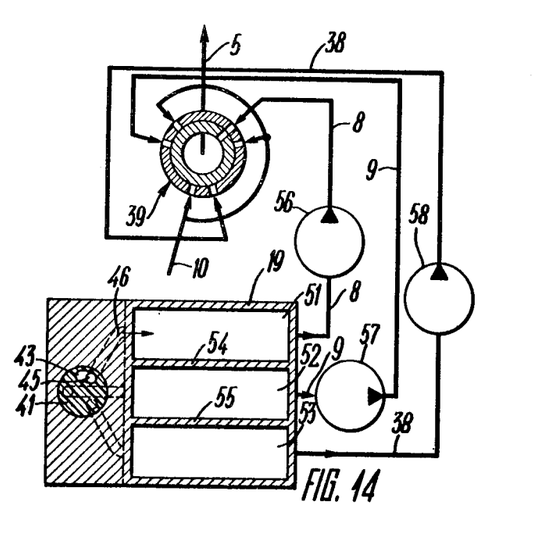
FIG. 14 shows the same device according to the invention with three individual pumps in the pipes for the liquid media.

FIG. 14 illustrates the embodiment of a device for electrolytic treatment of workpieces with individual pumps 56, 57 and 58 installed, respectively, in the lines of the pipes 8, 9 and 38. In this embodiment of the device there is no need for a pump in the common pipe 5.

The device similar to that shown in FIG. 10 can also be used for treatment of workpieces with more than three liquid media.

In this case it is sufficient to provide additional inlets for the new liquid medium and gas, a hole 45 for the discharge of this medium, a container, and additional locking holes 30 (FIG. 4) of the control element 50 (FIG. 10).

The device for electrolytic treatment of workpieces functions as follows.

Figure 2:
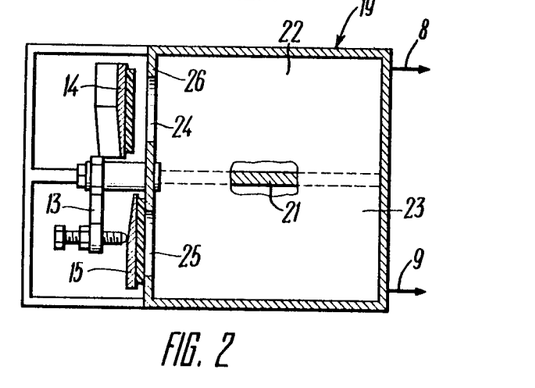
FIG. 2 is a section taken along line II—II in FIG. 1 of the same device, according to the invention.

As a negative potential is applied to the tool-electrode 3 (FIG. 1) and the positive potential, to the workpiece 2, the pump 6 is turned on. The handle 28 (FIG. 4) is set to a position corresponding to the treatment of the workpiece with the first liquid medium, i.e. with electrolyte contained in the container 22 (FIG. 2).

The electrolyte is delivered from the container 22 into the common pipe 5 by the pump 6 (FIG. 1) through the pipe 8 and the distribution valve 7 which is set for feeding the first liquid medium; then the liquid flows into the working space 4 between the tool-electrode 3 and the workpiece 2.

Shifting the handle 28 (FIG. 4) turnes the rod 12 (FIG. 1) which sets the distribution valve 7 as required and turns the internal member 33 (FIG. 5) of the articulated joint 16. The projection 34 engages the wall of the space 35 and turns the external member 32 of the joint 16 which sets the cam 13 (FIG. 3) to a position in which the gate 15 is kept closed and the gate 14, open.

As a result, the used electrolyte flows through the holes 17 (FIG. 1) of the chamber 1 into the intermediate container 18 wherefrom it passes through the port 24 (FIG. 2) and the open gate 14 into the corresponding container 22 for the first liquid medium.

On completion of the treatment operation with the use of this medium, the handle 28 (FIG. 4) is shifted to the position for feeding a gas and locked in the hole 30.

This is accompanied by the turning of the rod 12 which moves the distribution valve 7 (FIG. 6) to the position for feeding a gas under pressure. Acted upon by the turning of the rod 12 (FIG. 1), the projection 34 (FIG. 5) moves on an idle travel from one wall of the space 35 (FIG. 5) to the other (the position of the projection 34 is shown by dotted lines), without coming in engagement and without turning the external member 32 of the joint 16. The gates 14 (FIG. 3) and 15 and the cam 13 stay in the previous position.

The gas under pressure supplied through the valve 7 (FIG. 1) into all the lines of the device removes the remaining quantities of the first liquid medium and aids in repair draining of these quantities into the container 22 (FIG. 2).

On completion of blowing with gas the handle 28 (FIG. 4) is shifted to the next position.

This is accompanied by the turning of the rod 12 (FIG. 1) which moves the distribution valve 7 (FIG. 7) to the position for feeding the second liquid medium, i.e. the washing liquid, and turns and internal member 33 (FIG. 8) of the articulated joint 16. The projection 34 engages the wall of the space 35 and turns the external member 32 of the joint 16, setting the cam 13 (shown by dotted lines in FIG. 3) to the position in which the gate 14 is kept closed and the gate 15, open.

As a result, the second liquid medium, i.e. the washing liquid, flows from the pipe 9 (FIG. 7) into the pipe 5 and, after acting on the workpiece is drained through the intermediate container 18 (FIG. 1) and the port 25 (FIG. 2) with the open gate 15 (FIG. 3) into the corresponding container 23 (FIG. 2) for the washing liquid.

Then the handle 28 (FIG. 4) is shifted to a position for feeding a gas under pressure and the process of treatment with two liquid media is repeated over again.

The gas under pressure is fed into the pipe 10 (FIG. 1) from an external source (not shown in the drawing).

The handle 28 (FIG. 4) can be actuated either manually or automatically, from an external control appliance.

The device shown in FIG. 10 and intended for electrolytic treatment of a workpiece with three liquid media functions as follows.

When the handle 28 (FIG. 4) is set to the corresponding position, this turns the rod 47 (FIG. 10) causing the distribution valve 39 to feed the first liquid medium, i.e. electrolyte, from the pipe 9 into the common pipe 5.

Simultaneously, rotation of the rod 47 is transmitted by the bevel gears 49 and 48 to the bar 42. The disc 41 of the drain cock 40 turns until its hole 43 gets in line with the corresponding hole 45 in the bottom 44 of the intermediate container 18, said hole communicating through the pipe 46 with the container 52 (FIG. 11) for the first liquid medium.

After machining, this liquid medium drains through the holes 17 (FIG. 10) into the intermediate container 18 and further, through the holes 43 (FIG. 11) and 45, into the corresponding container 52.

Now the handle 28 (FIG. 4) is turned to the next position corresponding to the feed of a gas under pressure.

The distribution valve 39 (FIG. 12) is set to admit the gas from the pipe 10 and the disc 41 turns through a small angle so that part of the hole 43 in the disc 41 remains in alignment with the hole 45 communicating with the container 52.

The gas under pressure supplied through the valve 39 into all the lines of the device removes the remaining quantities of the first liquid medium and aids in rapid draining of these quantities into the container 52.

As the handle 28 (FIG. 4) is turned to a further position corresponding to the feeding of the second liquid medium, i.e. washing liquid, the distribution valve 39 (FIG. 13) moves to supply this liquid from the pipe 8 and, as shown in the drawing, the hole 43 gets in line with the corresponding hole 45 which communicates through the pipe 46 with the container 51 for the washing liquid.

Then, as it is described above, the working space is supplied with a gas under pressure and the workpiece is treated with the third liquid medium, i.e. passivating solution, which is drained into the container 53 and delivered for machining through the pipe 38.

The method of electrolytic treatment of workpieces and the device for the realization thereof when used in the processes of electrolytic treatment on electroerosion machines for deburring and on contour-broaching machines for broaching permit efficient separation of different liquid media after their use for treatment, thereby improving the stability of the process and the quality of treatment.

The device for electrolytic treatment of workpieces is simple in design, reliable in service and enables a workpiece to be treated with any number of liquid media in any required combination.

What we claim is:

1. A device for electrolytic treatment of workpieces with at least two liquid media and a gas under pressure, said gas being supplied within a time period between alternate feeding of said two liquid media, comprising:
    a working chamber for accommodating a workpiece:
    a tool located in said working chamber and, jointly with said workpiece, defining a working space:
    a common pipe for alternate feeding of two liquid media and a gas under pressure into said working space:
    a first pipe for the first liquid medium, connected to said common pipe;
    a second pipe for the second liquid medium, connected to said common pipe at a coupling joint with said first pipe;
    a third pipe for a gas under pressure connected to said common pipe at said coupling joint;
    an intermediate container;
    individual containers for each liquid medium;
    a means for alternating the supply of said two liquid media to said workpiece and their discharge after treatment of said workpiece through said intermediate container into said individual containers for each liquid medium;

a distribution valve in the last-mentioned means for alternating the feeding and discharge, installed directly at said coupling joint of said pipes;

a control element in said last-mentioned means for alternating the feed and discharge, kinematically linked with said distribution valve for alternate opening by the latter of said pipes for the liquid media and gas in a predetermined order; and a mechanism for separating the discharge of the different liquid media incorporated into said means for alternating the feeding and discharge, kinematically linked with said distribution valve and control element.

2. A device according to claim 1 comprising:

a cam in said mechanism for separating the discharge of different liquid media;

a rod of said separating mechanism, connected with said distribution valve and control element;

an articulated joint of said separating mechanism consisting of an external member and an internal member;

said internal member of said articulated joint, being rigidly connected with said rod and provided with a projection;

said external member of said articulated joint, being rigidly connected with said cam and having a space which is segment-shaped in cross section;

one of the walls of said intermediate container having ports;

two gates of said separating mechanism, installed in ports of one of the walls of said intermediate container and alternately opened and closed by said cam.

3. A device according to claim 1 comprising:

a drain cock in said mechanism for separating the discharge of different liquid media;

a disc in said drain cock having a through hole and installed in a hollow on the bottom of said intermediate container with means providing for rotation of said disc around the axis thereof;

a bar of said drain cock, installed in line with said rotation axis of said disc and rigidly fastened to the latter;

a rod of said separating mechanism, connected with said distribution valve and said control element and linked kinematically with said bar;

bevel gears providing a kinematic linkage between said bar and rod;

said bottom of said intermediate container provided in the zone of said hollow with holes for the discharge of the liquid media, the number of said holes being equal to the number of the liquid media, said holes being arranged around the circumference on a radius which is equal to the distance from the centre of said disc to said hole of said disc and spaced at a distance from one another which is larger than the maximum size of said hole in said disc;

said hole of said disc, the ratio of the maximum size of said hole to the size of said holes in said bottom of said intermediate container being chosen so as to ensure alignment of said hole in said disc with the corresponding hole in said bottom of said intermediate container both during the discharge of one liquid medium and during the subsequent feeding of a gas under pressure.

* * * * *